(12) United States Patent
Oberhauser et al.

(10) Patent No.: US 6,269,442 B1
(45) Date of Patent: Jul. 31, 2001

(54) APPARATUS AND METHOD FOR ON-LINE REPLACEMENT OF A RUNNING PROGRAM CODE AND DATA USING CHECKPOINTS

(75) Inventors: Roy T. Oberhauser, Santa Clara; Michael Lawrence Saboff, San Jose, both of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/191,960

(22) Filed: Nov. 13, 1998

(51) Int. Cl.[7] ......................................................... G06F 1/24
(52) U.S. Cl. ................................................. 713/1; 713/100
(58) Field of Search ...................................... 713/1, 2, 100; 364/200

(56) References Cited

U.S. PATENT DOCUMENTS

| | | | |
|---|---|---|---|
| 4,947,315 | * | 8/1990 | Sokolow et al. ...................... 364/200 |
| 5,410,703 | * | 4/1995 | Nilsson et al. ........................... 717/1 |
| 5,621,885 | * | 4/1997 | Del Vigna, Jr. ......................... 714/13 |
| 5,764,992 | * | 6/1998 | Kullick et al. .......................... 717/11 |
| 5,838,981 | * | 11/1998 | Gotoh ..................................... 717/11 |
| 5,883,955 | * | 3/1999 | Ronning ................................... 380/4 |

* cited by examiner

Primary Examiner—Bipin Shalwala
Assistant Examiner—Nitin Patel

(57) ABSTRACT

Apparatus and method are provided for on-line replacement of a program running in a process. The apparatus and method do not require a special operating system, but instead use a few standard operating system calls (i.e, fork and exec, etc.). Therefore, the apparatus is highly portable between different operating system machine types.

24 Claims, 14 Drawing Sheets

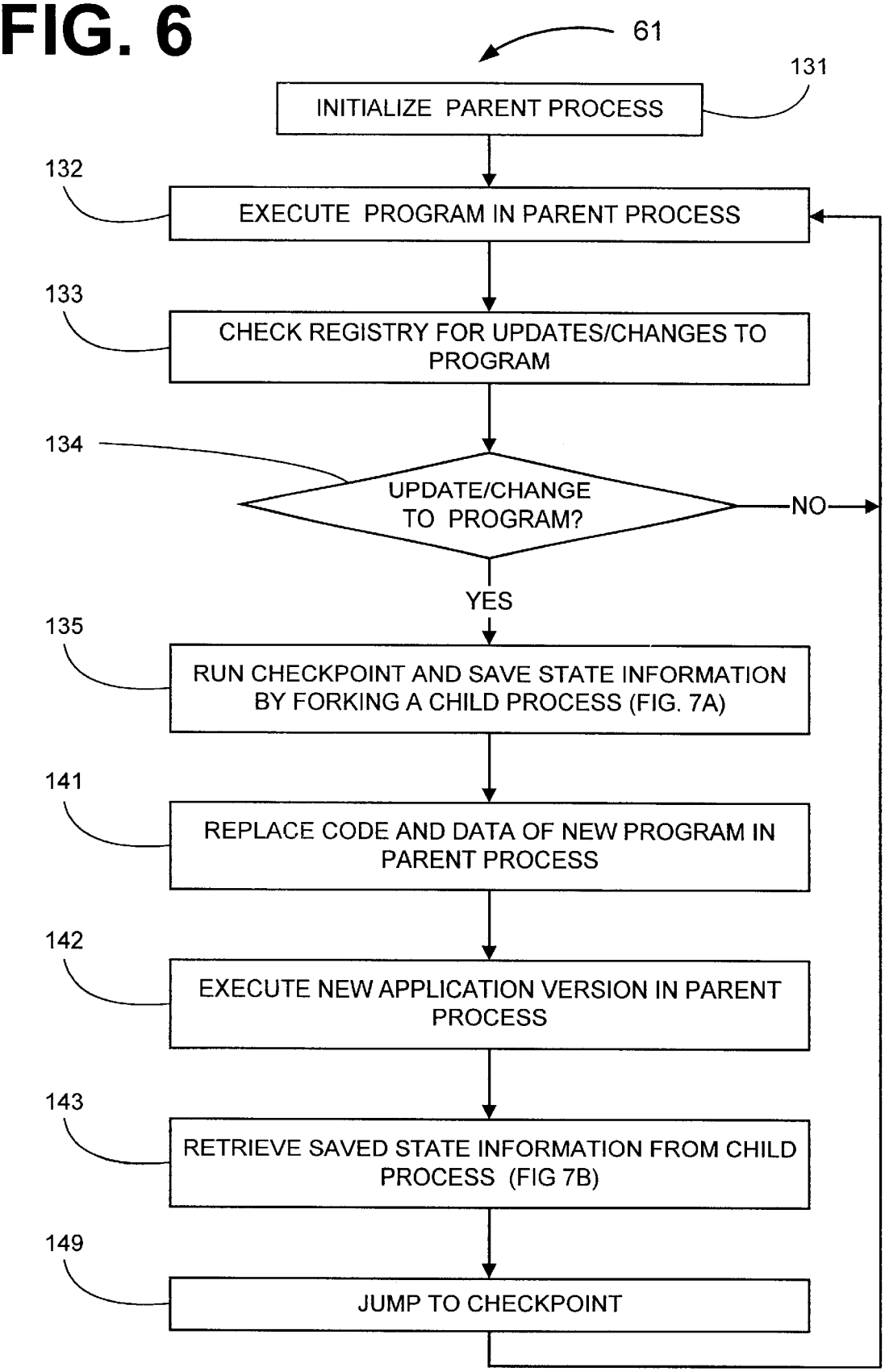

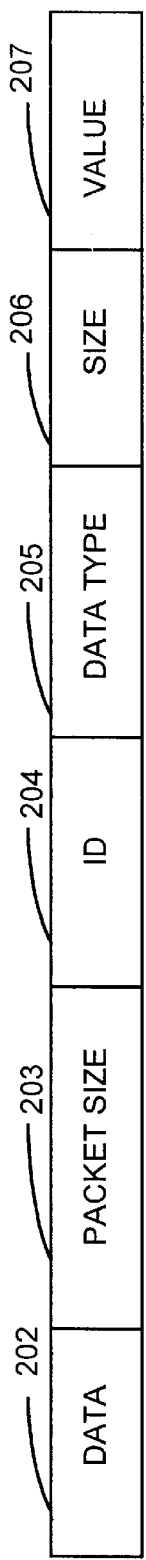
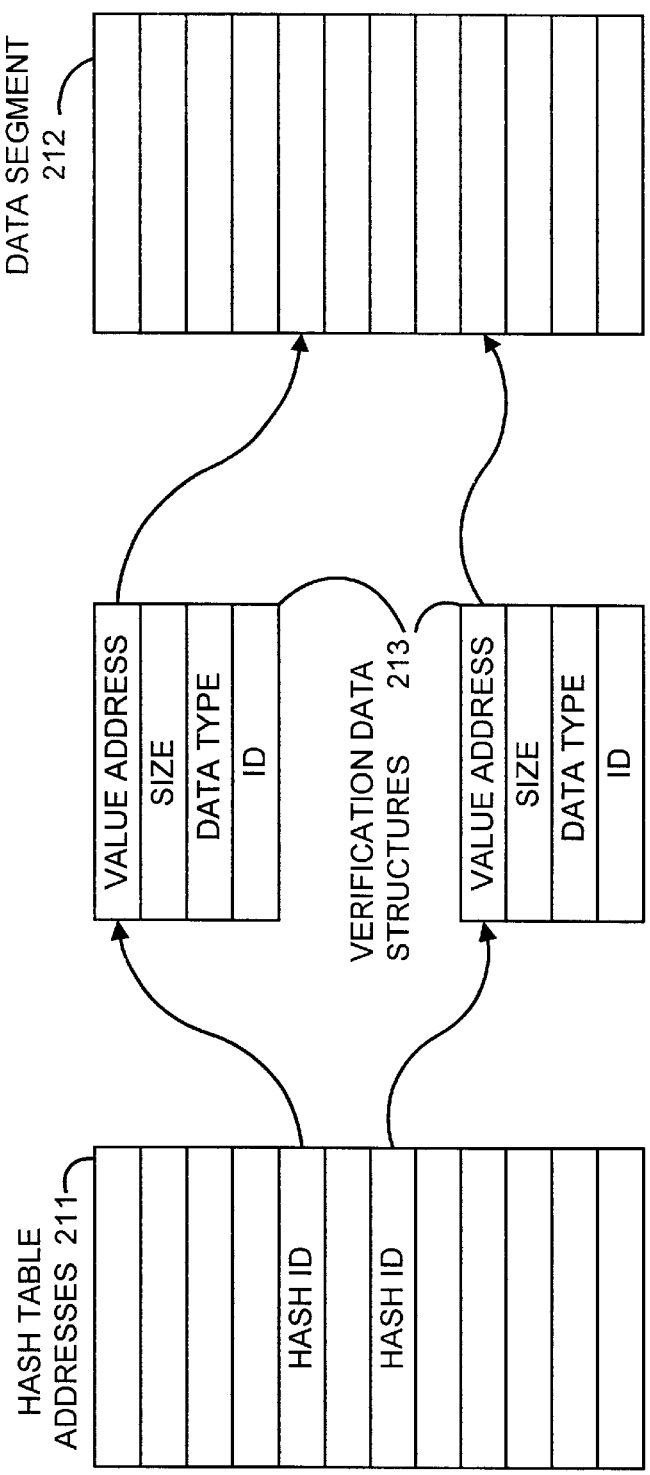
FIG. 9A  VARIABLE DATA PACKETS - 201
FIG. 9B  HASH TABLE STATIC DATA TRANSLATION PROCESS - 210

APPARATUS AND METHOD FOR ON-LINE REPLACEMENT OF A RUNNING PROGRAM CODE AND DATA USING CHECKPOINTS

BACKGROUND OF THE INVENTION

1. Field of the Invention

The present invention generally relates to computer software and, more particularly, to an apparatus and method for replacing a running program code and data within the same process of a computer program.

2. Description of Related Art

As known in the computer and software arts, software programs undergo many changes during their product life. The changes either enhance the system through updates or remove problems (i.e., bugs) from the program steps. In either circumstance, the software program is usually replaced with a new version of the program.

Typically, when a software program is replaced with a new version, the old version of the program is terminated and the new version is started. This, however, creates a problem where the program operation is interrupted for some time period.

While there are some solutions for on-line software version changes, these techniques suffer from the following problems. One problem with computer systems in the prior art that are designed to allow real-time software updates is that they require a special operating system or support changes within the operating system. These changes may include modifications to the compilers and/or linkers.

Another problem is that operating systems designed to allow software program updates on-line or on-the-fly, use indirect addressing tables to link different modules together utilizing complicated mechanisms. The use of indirect addressing tables impacts the performance of the overall system software.

The prior art also suffers the problem of transferring the state from the old process to the new process, along with transferring control using the stack monitoring system. However, this transferring of the state to the new version program in the new process suffers the following performance problems.

First, the main function of the program in either the old version or the new version can never change.

While the stack can be used and transferred from the old program in the old process to the new program in the new process, no new procedure area layers can be added. New procedure area layers cannot be added because they would cause errors in the processing since they would be returning to procedures at different addresses.

Furthermore, when transferring control from an old version of a program in an old process to a new version of a program in a new process, the assumption that the program counter can be converted implies that the offset to a function or procedure may never change due to the offset addressing within the version of the program.

Transferring from an old program/process to a new version program/process also assumes that no extra global or static variables can be added or deleted. The reason is that this would cause errors in the execution of the new program/process.

Next, the transfer from an old program/process to a new version program/process implies that the addresses of the data remain constant across the two version, i.e., there is no reordering or optimization changes, etc.

For the return value or parameter format changes, an intraprocedure is written that adds extra overhead on each function call and make it more difficult to maintain the software.

Additionally, stack monitoring techniques cannot guarantee that the old program/process is not performing a time critical task when the state transfer routine is initiated.

Also, the new program/process loses attributes associated with the old process such as the process identification (ID), all the network connections, file connections, and the like, when the old process is terminated to restart within the new process.

In addition, to initiate state transfer, one inserts an illegal instruction and assumes there can be no other causes for this illegal instruction or trap, which would thereby make it possible to initiate a state transfer at the wrong time.

Hence, software users have lacked the ability to allow a program running in a process to be replaced with a new version of a program within the same process without loss of service or state.

SUMMARY OF THE INVENTION

The present invention is generally directed to an apparatus and method for on-line replacement of a computer program running in a software process. In accordance with one aspect of the invention, the apparatus and method place an online program in a predetermined state, repeatedly determine if a newer online program exists for providing a requested service, preserve online program data if a newer online program exists, executing the newer online program to provide the requested service, and utilize the preserved current program data during the newer online program's execution.

The apparatus and method for on-line replacement of a program running in a process does not require a special operating system, but instead uses a few standard operating system calls (i.e, fork and exec, etc.). Therefore, the apparatus is highly portable between different operating system machine types.

In accordance with one embodiment of the apparatus and method of the present invention, a checkpoint methodology allows the programmer maximum flexibility in addressing upgrade/replacement program issues and determines where, when and how the transition to a new version of a program should occur with least impact to the services.

In accordance with another embodiment of the present invention, procedures have complete flexibility to change arguments or return values and change calling order, function names, function code and the like within the new version of the program since stack monitoring techniques are not being used.

BRIEF DESCRIPTION OF THE DRAWINGS

The accompanying drawings incorporated in and forming a part of the specification illustrate several aspects of the present invention, and together with the description, serve to explain the principles of the invention. Moreover, in the drawings, like reference numerals designate corresponding parts throughout the several views. In the drawings:

FIG. 6 is a flow chart of the method to update/replace the program within process A by utilizing check points and saving state information by forking a child process as shown in FIG. 3.

FIG. 9A is a block diagram of the variable data packet used to transfer a data item from the old child process to the new parent process.

FIG. 9B is a block diagram for the hash table variable data translation process.

DETAILED DESCRIPTION OF THE PREFERRED EMBODIMENT

Figure 1:
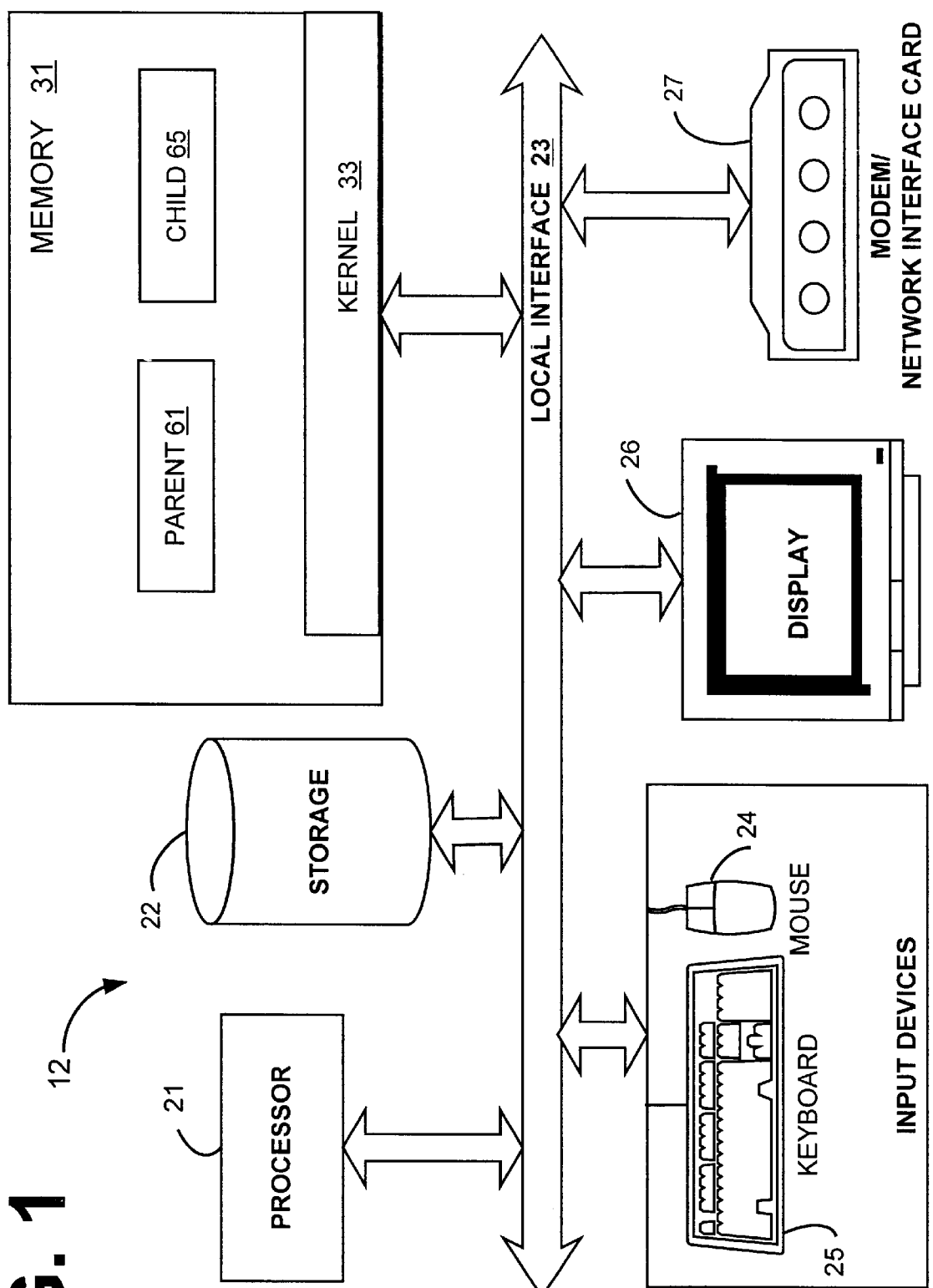
FIG. 1 is a block diagram of a computer system having user system processes in the operating system.

Reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims.

As illustrated in FIG. 1 is a computer system 12 which generally comprises a processor 21, a storage device(s) 22, and system memory 31 with an operating system 32. Both the storage device 22 and memory 31 include instructions that are executed by the processor 21. Storage device(s) 22 can be, for example, in any one or combination of the following: compact disc read only memory (CD-ROM), disk, diskette, cartridge, cassette, ROM or the like. The memory 31 can be either one or a combination of the common types of memory such as for example, but not limited to, erasable programmable read only memory (EPROM), electronically erasable programmable read only memory (EEPROM), flash memory, programmable read only memory (PROM), random access memory (RAM), read only memory (ROM), flash memory, Dynamic random access memory (DRAM), Static random access memory (SRAM), system memory, or the like. The processor 21 accepts data from memory 31 or storage device 22 over the local interface or bus 23. Direction from the user can be signaled by using an input device(s) for example, a mouse 24, keyboard 25, or the like. The action input and result output are displayed on the display terminal 26. Parent process 61 executes an old version of the program 62 and child process 65 is used to save and transfer the state data.

Parent process 61, the old program 62, the new program 63, a checkpoint and swap management library 64, a child process 65, and a registry 68, all of which can be implemented in hardware, software, firmware, or a combination thereof. In the preferred embodiment(s), the parent process 61, old program 62, new program 63, checkpoint and swap management library 64, child process 65 and the registry 68 are implemented in software or firmware that is stored in a memory and that is executed by a suitable instruction execution system.

Figure 2:
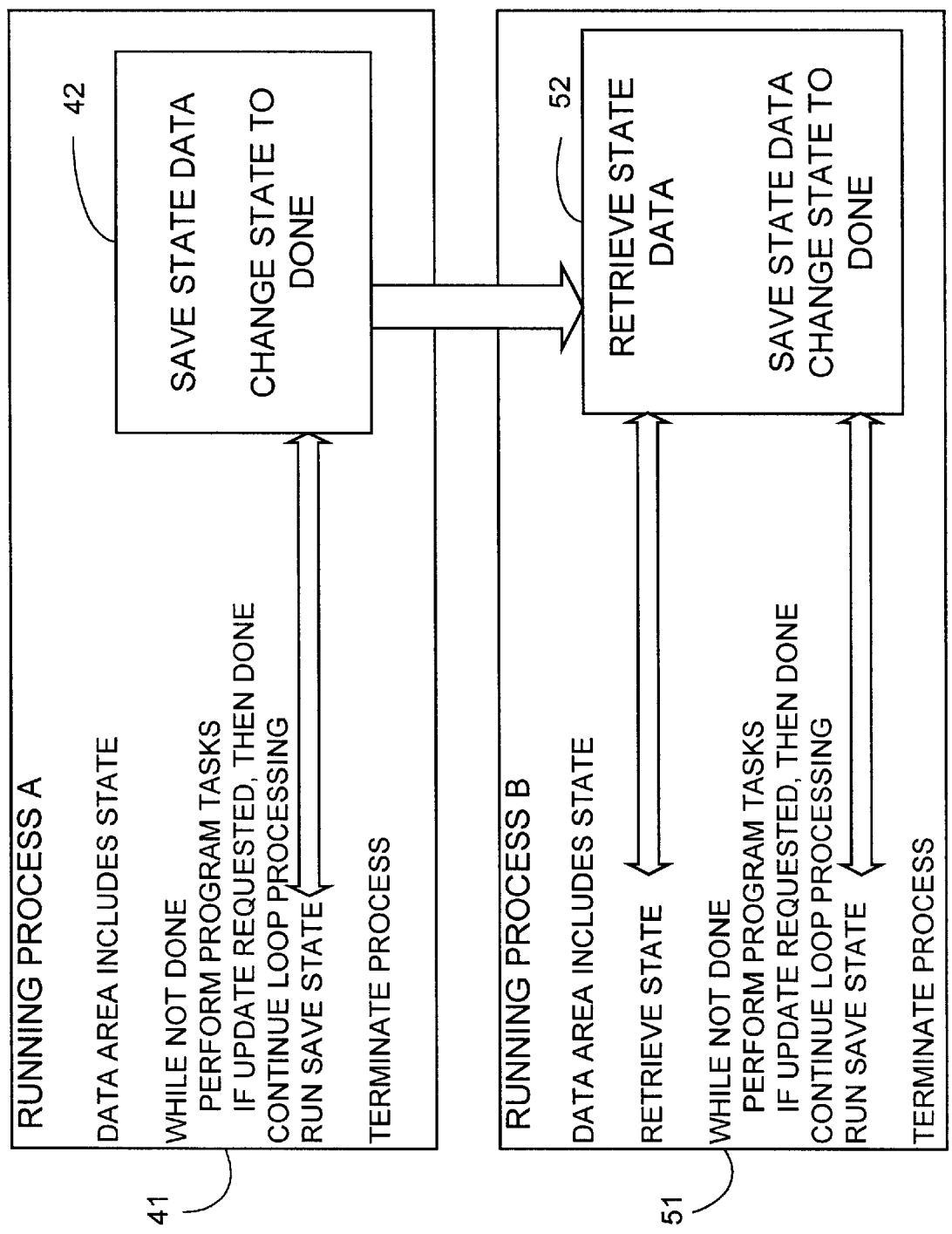
FIG. 2 is a block diagram showing the prior arts of state transition from a first program running within process A and transferring state to a second program within process B.

Illustrated in FIG. 2 is a well known method of updating a running process. Normally, when a process 41 is to be updated on-line, the program calls a state saving routine 42 that saves the state information of the program executing in process A 41. Once the state data is saved, process A 41 terminates and process B 51 is executed. Process B 51 retrieves the state data utilizing the retrieve state data routine 52. Then, while process B 51 is not done, it performs the program task, and if an update is requested, then it is done and it continues the loop processing and repeats the steps in program running in process B at 51. This method is time consuming and requires an extra data storage area for saving the state information.

Figure 3:
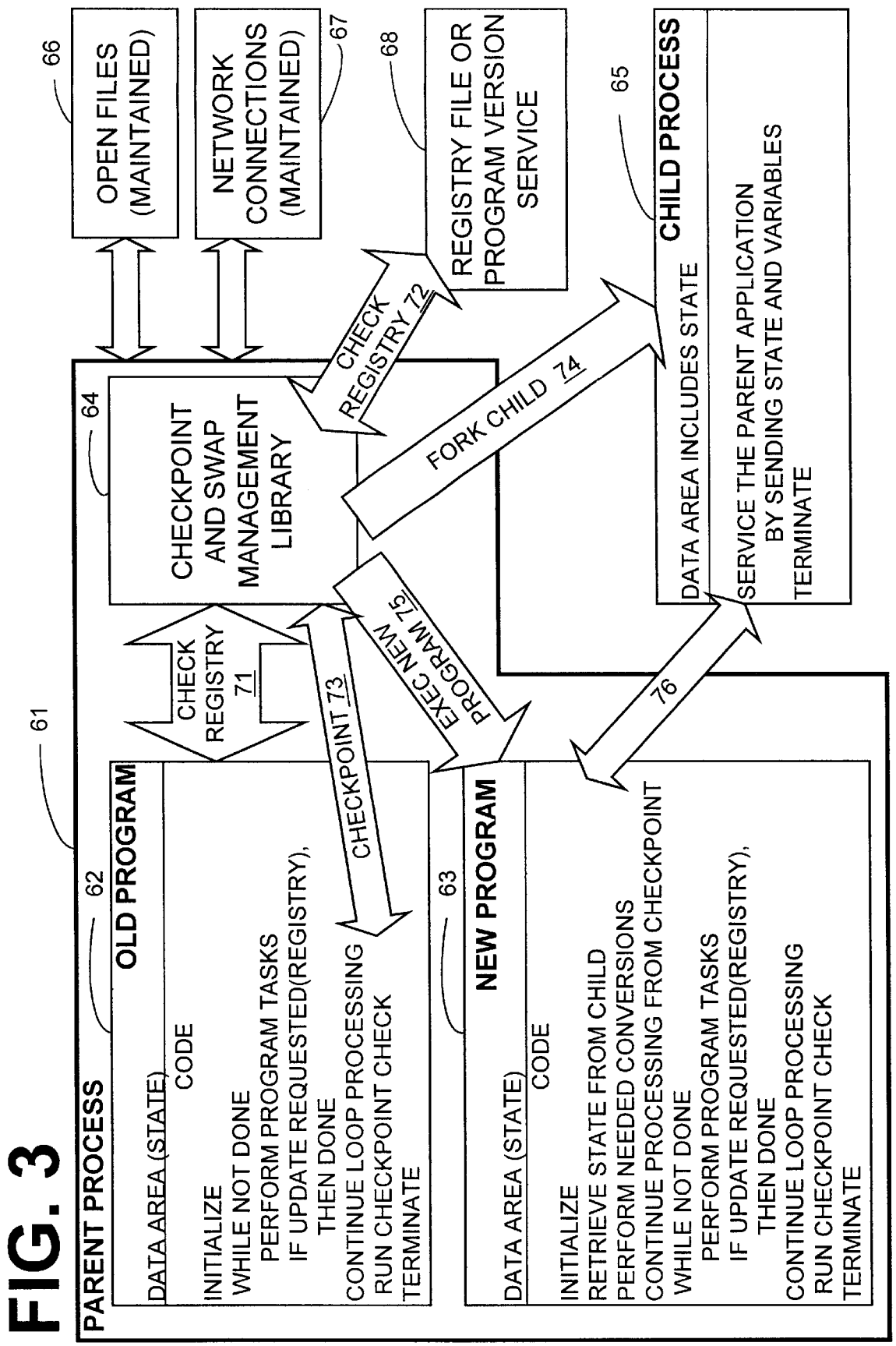
FIG. 3 is a block diagram of the present invention showing the flow between the old program within the parent process to the new program running within the parent process utilizing a child process to save data variables, including the state information of the present invention.

Illustrated in FIG. 3 is online replacement of a program running in a process using the checkpoint system of the present invention. As parent process 61 executes the old program 62, the old program 62 executes code which periodically checks to see if old program 62 is done. If the old program 62 is not done, parent process 61 continues to perform the program 62 tasks checks if program update is requested 71 and continues loop processing. In the preferred embodiment, the check if a program update is requested is accessing the Checkpoint and Swap Management Library 64 via 71, which further checks the registry file 68 via link 72.

Checkpoint and swap management library 64, when accessed, checks the registry file or program version service number 68, via the check registry communication 72. If the registry file or program version service 68 indicates that no new program version has been put in service, then the checkpoint in swap management library 64 returns to the old program 62 via return of check 71.

In the event that a new program version is to be placed in service, the checkpoint and swap management library 64 forks a child process 65 via link 74. The child process 65 is created with a complete copy of the parent process 61, including variables and state data information. The checkpoint and swap management library 64 terminates the old program 62 and executes the new program 63, via the exec command 75.

The new program 63 may contain new or deleted variables and/or routines. The new program 63 initializes its data and retrieves the state data from the child via communication link 76. The new program 63 performs any needed data transformations on the retrieved state data. The new program 63 continues processing from the checkpoint utilizing the state information acquired from the child process 65, and, while not done, performs the registry check 71, and the program task, and loops until done as described above with regard to program 62. The apparatus and method for online replacement of a program running in a process using checkpoints will be explained further with regard to FIGS. 6, 7A and 7B.

Figure 4:
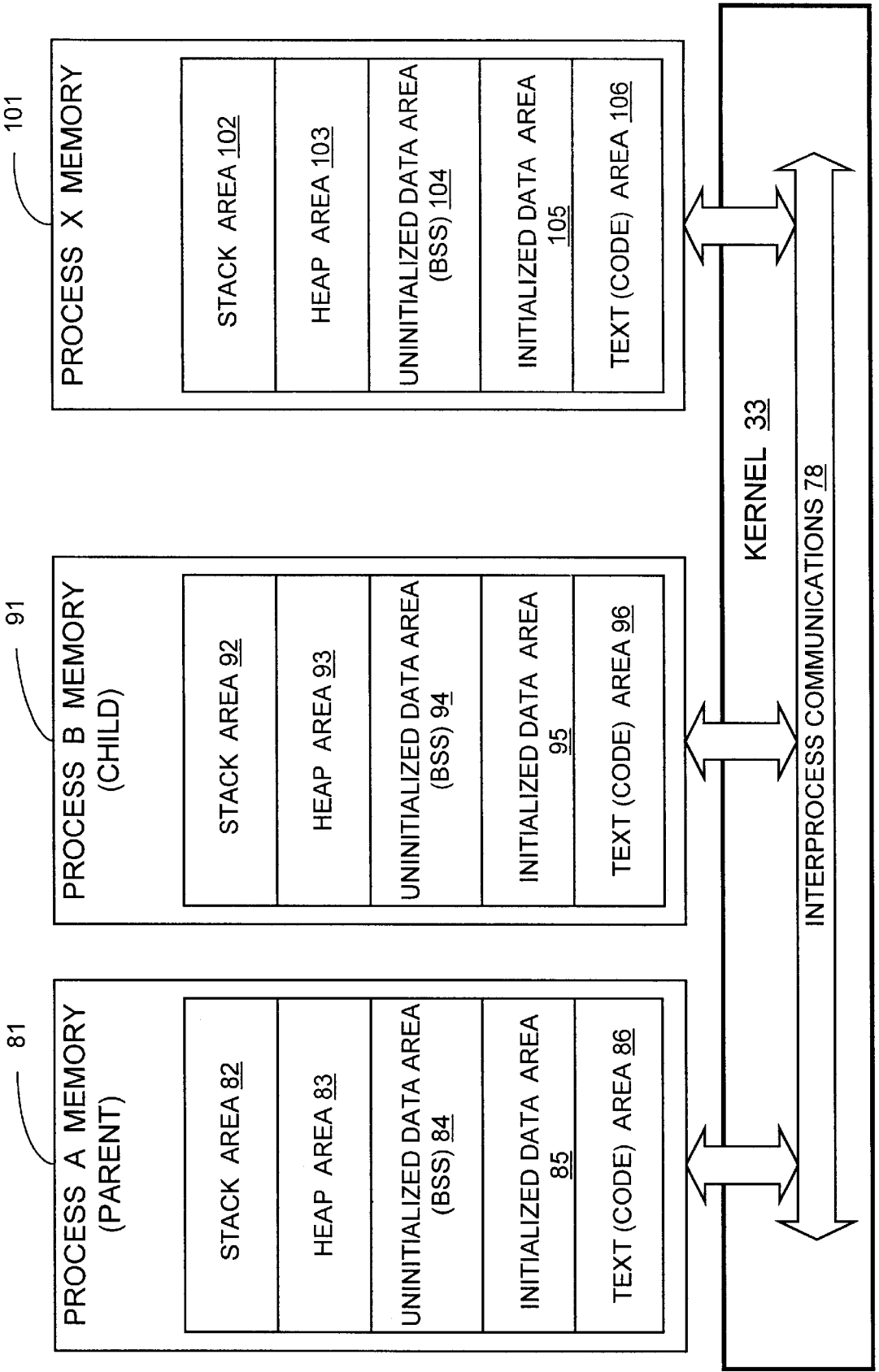
FIG. 4 is a block diagram showing the memory layout of a process within the operating system as shown in FIG. 1.

Illustrated in FIG. 4 is the memory map of each user process for the system illustrated in FIG. 1. The kernel 33 provides interprocess communication 78 facilitator interprocess communications via link 76. Process A memory 81 includes a stack area 82, a heap area 83, an uninitialized data area 84, an initialized data area 85, and a text or program code area 86.

Process B memory 91 and any other processes also include stack area 92, heap area 93, the uninitialized data area 94, initialized data area 95, and the text or program code area 96 in their process. The Process B (i.e. the child process) is an exact copy of the parent process A memory 81 when the fork command is executed, and explained above with reference to FIG. 3.

Figure 5:
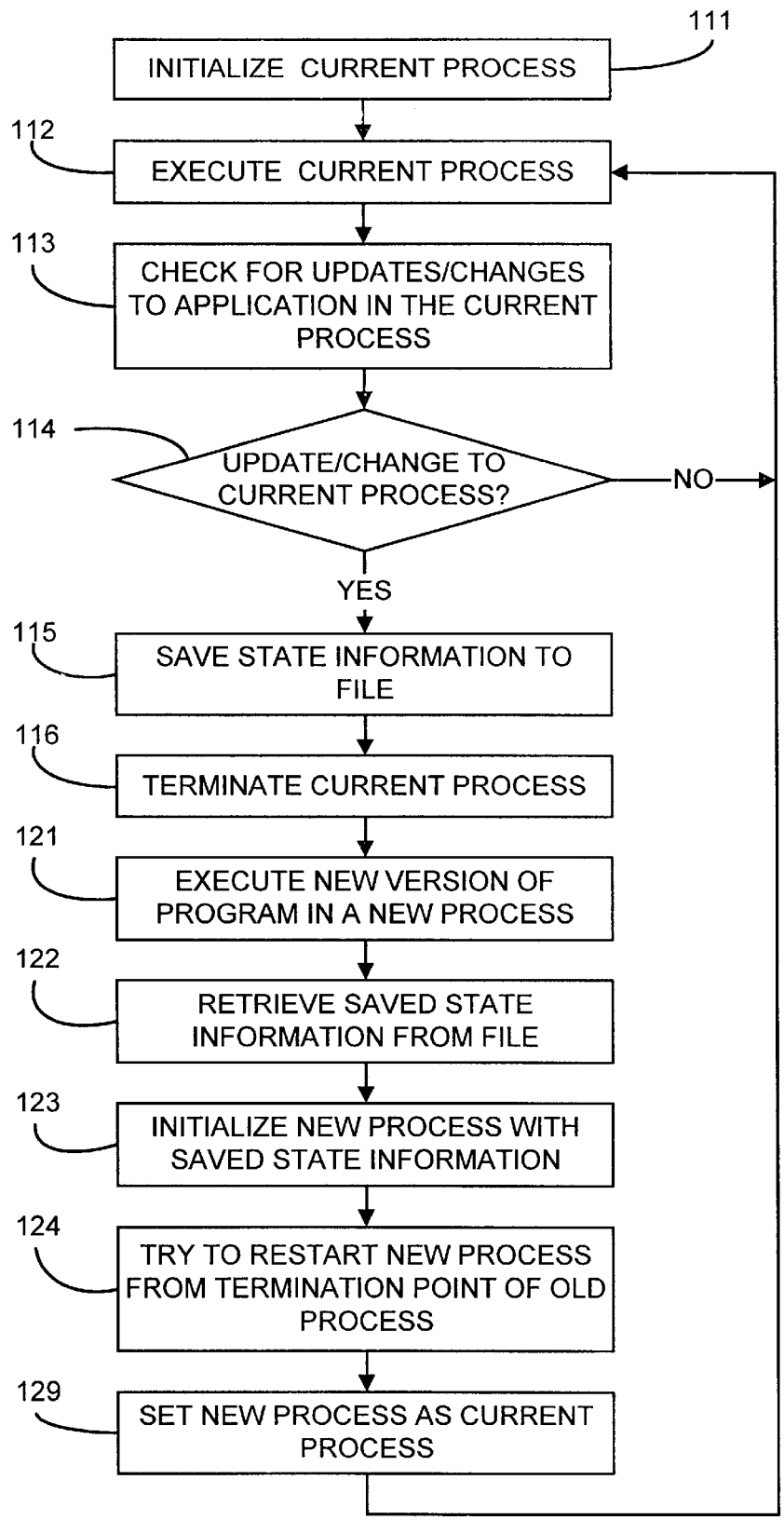
FIG. 5 is a flow chart of the prior art method for transitioning from program 1 in process A to an updated program B in process 2 as shown in FIG. 2.

Illustrated in FIG. 5 is the prior methodology of performing an online update of a program version. The current process 41 is initialized at step 111 and executed at step 112. A check for updates or changes to an application in the current process 41 is performed at step 113. If the update or change to current process check is negative at step 114, then the current process 41 continues executing at step 112. If the update/change to the current process 41 is affirmative at step 114, then the state information is saved to a file at step 115. Next, the current process 41 is terminated at step 116.

Execution of the new version of a program in the new process 51 is performed at step 121. The new version of a program in the new process 51 with a new process ID first retrieves the state information from a file at step 122. The new version of the program in the new process 51 then initializes the new process 51 with the saved state information retrieved from the stack or file at step 123, and thereafter the new process 51 attempts to restart from the termination point of the old process 41 at step 124. Finally, the new process 51 is set as a current process in step 129 and continues execution at step 112. As illustrated in FIG. 5, the prior art requires execution of the new version of the program in a new process.

The flow charts of FIGS. 6–10B show the architecture, functionality, and operation of a possible implementation of the replacing a running program code and data within the same process software. In this regard, each block represents a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved, as will be further clarified hereinbelow.

Illustrated in FIG. 6 is the apparatus and method of the present invention. The apparatus and method provides a distinct advantage in that the termination of the old program and process is not required in order to execute a new version of a program.

First, the parent process 61 (FIG. 3) is initialized at step 131 and, in step 132, the parent process 61 executes the old program 62 while not done at step 132. At step 133, the old program 62 checks the registry 68 (FIG. 3), via link 72 (FIG. 3), for updates or changes to the old program 62. The check for updates or changes to the old program 62, also includes accessing a program version service as described with regard to FIG. 3. If, in step 134, there is not an update or change to the old program 62, the parent process 61 returns to step 132 to continue execution of old program 62.

Figure 7A:
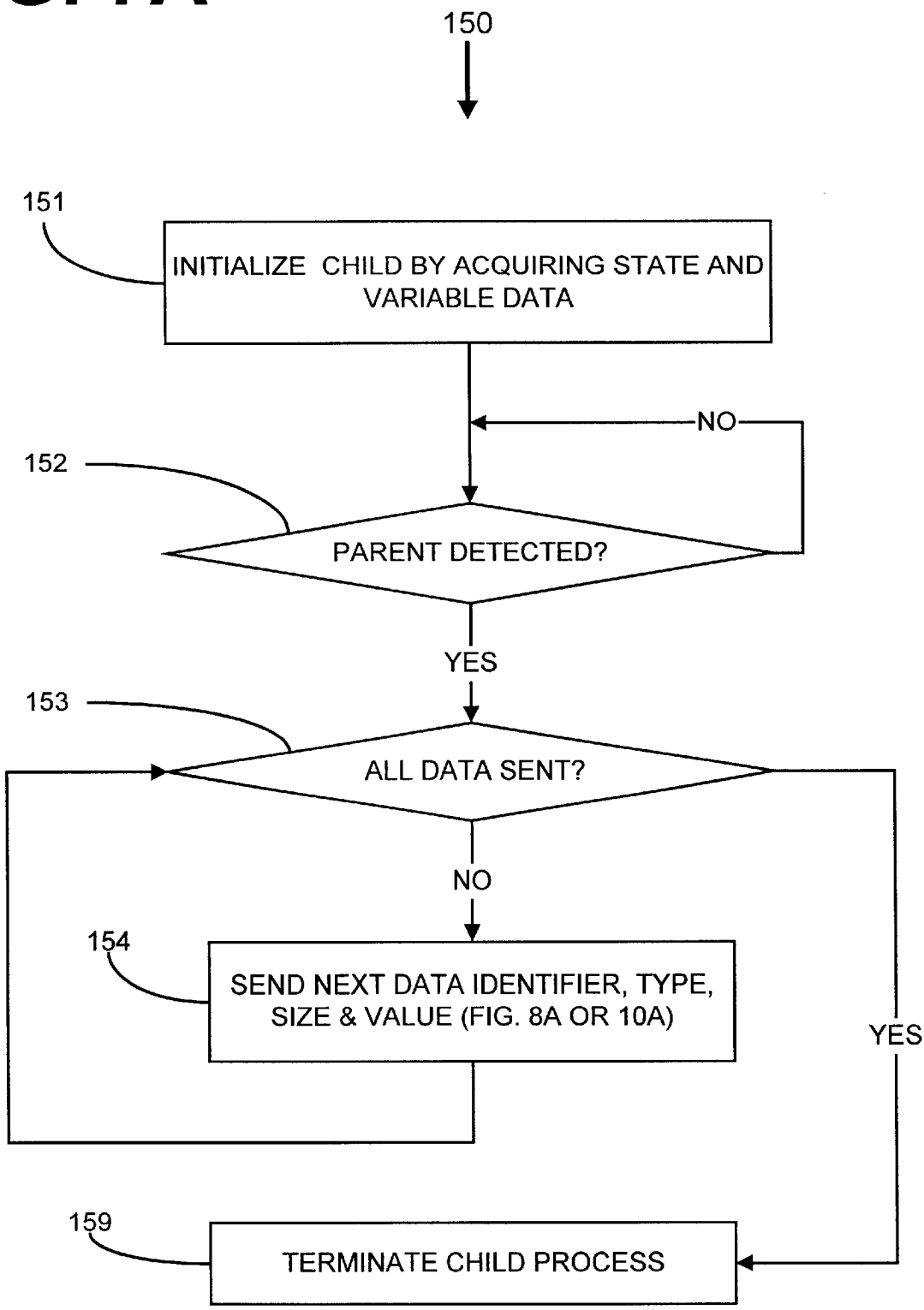
FIG. 7A is a flow chart of the child process transfer routine of the present invention, as shown in FIG. 6.

If at step 134, the update or change to a old program 62 (FIG. 3) within the parent process 61 is indicated, then the old program 62 runs a checkpoint 73 and saves the state information by forking a child process 65 (FIG. 3) at step 135, herein further defined with regard to FIG. 7A. Next, the parent process 61 replaces the entire memory area 81 (FIG. 4) with the code and data of the new version of the program 63 (FIG. 3) at step 141.

Next, the new program version 63, in the parent process 61, is executed at step 142. In the preferred embodiment, this is performed by utilizing the exec system call within the Unix operating system. It is well known that there are equivalent system calls in other operating systems that would perform the same function.

Figure 7B:
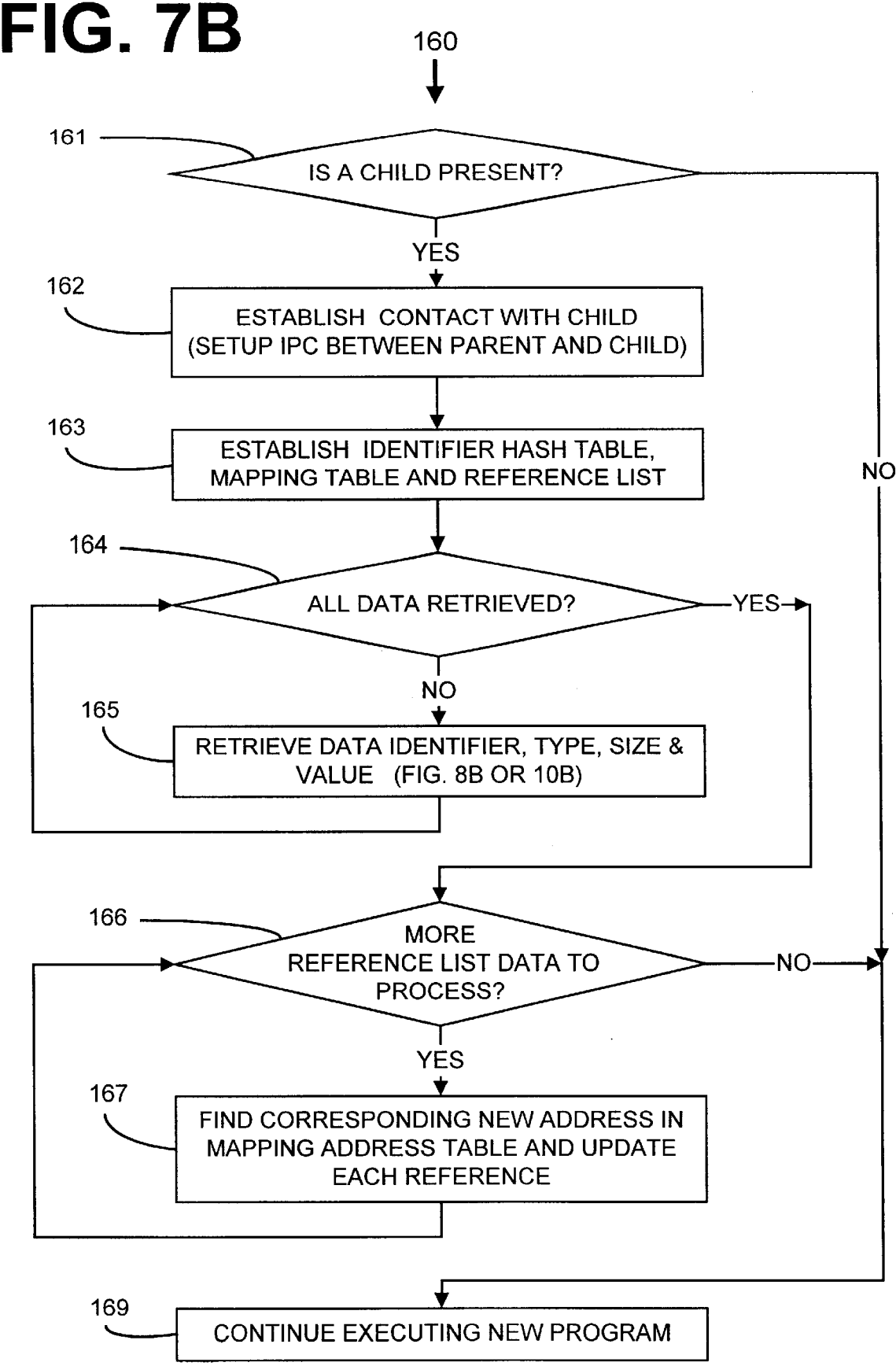
FIG. 7B is a flow chart of the parent state transfer routine of the present invention, as shown in FIG. 6.

The new program 63 in the parent process 61 then progresses to block 143 in which the state information is retrieved from the child 65, using a state retrieval routine 160, herein further defined with regard to FIG. 7B at step 143. Once the state information has been retrieved and the new program 63 is initialized within parent process 61, the new program 63 then jumps to the checkpoint code, at step 149, for subsequent execution and then returns to step 132 to execute within the parent process 61 and repeats the foregoing method.

The transfer of the process state from the old process (parent) to the new process (child) can be accomplished using several means. These include Sun's XDR/RPC, The Open Group's DCE RPC and ASN.1 compilers. Since the present invention doesn't require the remote capabilities of the RPC methods, so the present invention is a simplification of those processes. In fact, the use of the SUN XDR methodology used in conjunction with a simple, local interprocess communication mechanism is sufficient. Other similar methods can be constructed that take advantage of the local nature of the transfer.

The greater area of difficulty is automating the transfer of the process state so that an application programmer does not have to be made aware of the details of the transfer.

Illustrated in FIG. 7A is the initialization of the child state transfer routine 150 of the preferred embodiment. The child state transfer routine 150 is initialized at step 151. Next, the child process 65 (FIG. 3) tries to detect the parent at step 152. If no parent 61 (FIG. 3) is detected, the child process 65 then continues to repeat the check until a parent process 61 is detected. Once a parent process 61 is detected at step 152, the child process 65 checks if all data has been sent at step 153. If all the data is not sent, the child process 65 sends the next data identifier, type, size and value at step 154, herein further defined with regard to FIGS. 8A, 9A or 10A. The child process 65 then returns to step 153 to again check if all data has been sent. Once all the data has been sent, the child process 65 terminates at step 159.

Illustrated in FIG. 7B is the state transfer routine 160 of the parent process 61 (FIG. 3), according to the preferred embodiment of the present invention. First, the parent process 61 state transfer routine 160 tests if there is a child process 65 (FIG. 3) present at step 161. If no child process 65 is detected at step 161, the state transfer routine 160 progresses to continue step 169 where the new program 63 (FIG. 3) is executed.

If a child process 65 is detected, the parent process 61 state transfer routine 160 moves to step 162 and establishes contact with the child process 65 by setting up interprocess communication 76 and 78 between the parent process 61 and the child process 65. In the preferred embodiment, the interprocess communication 76 (FIG. 3) and 78 (FIG. 4) is facilitated using sockets. Thereafter, the parent state transfer routine 160 establishes an identifier hash table 211 (FIG. 9B), a mapping address table 256 (FIG. 11), and a reference list 261 (FIG. 11). Then, at step 164, parent process 61 state transfer routine 160 tests to determine if all data has been retrieved. If there is more data to be retrieved, then at step 165, parent process 61 state transfer routine 160 retrieves the data identifier 204 (FIG. 9A), type 205 (FIG. 9A), size 206 (FIG. 9A) and value 207 (FIG. 9A) from the child process 65. The parent process 61 receives data routine 165 is herein further defined with regard to FIG. 8B or 10B.

The parent state transfer routine 160 then returns to step 164 to again check if all data items have been retrieved, and loops between steps 164 and 165 until all data items have been retrieved. Once all the data items have been retrieved, then the parent process 61 state transfer routine 160 progresses to step 166 and checks if there is reference list data 261 (FIG. 11) to be processed. If there is reference list data 261 to be processed at step 166, then the parent state transfer routine 160 takes the old address 262/265 (FIG. 11) and finds a corresponding new address 258 (FIG. 11) and updates that reference since it has the reference address 263/266 (FIG. 11) at step 167. The updating of the reference list 261 is further defined with regard to FIG. 11.

After the next reference new address is determined and the reference updated at step 167, the routine then returns to check if there is more reference data to be processed at step 166, and repeats the steps 167 and 166 loop if there is more reference data to be processed. If there is no more reference data to be processed, parent process 61 state transfer routine 160 then continues to step 169, which returns for continued execution of the new program 63.

Figure 8A:
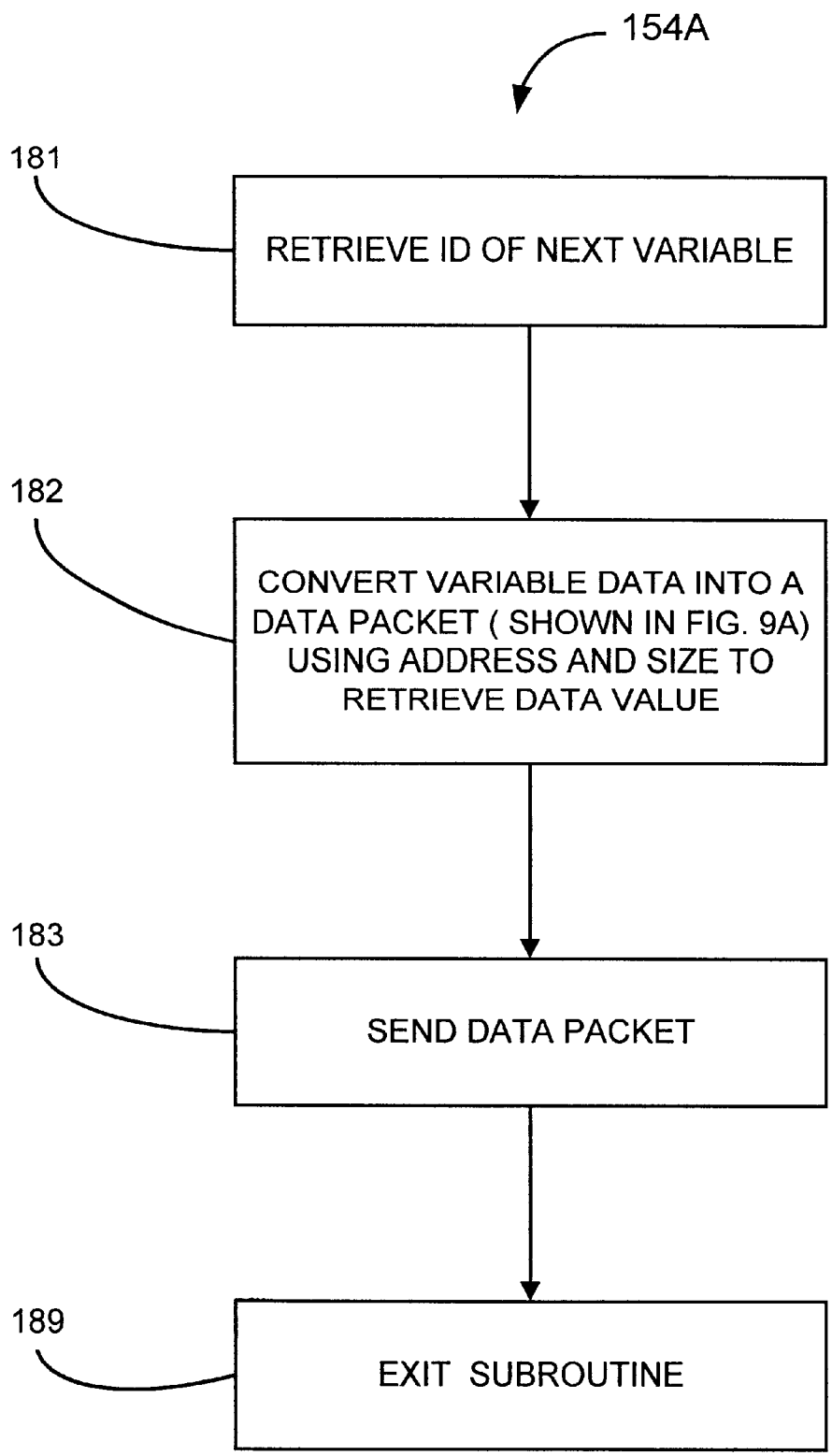
FIG. 8A is a flowchart of the send next data item subroutine of the present invention, as shown in FIG. 7A.

Illustrated in FIG. 8A is the flowchart of the send next data item subroutine 154A, in which the data variable is sent from the child process 65 (FIG. 3) to the parent process 61 (as referenced in FIG. 7A, step 154). First, the child process 65 retrieves the ID of the next variable in step 181. The child process 65 converts the variable data into a data packet 201 (FIG. 9A) using the address and size to retrieve the data value at step 182. The data packet 201 is further defined in detail with regard to FIG. 9A.

The child process 65 then sends the data packet to the parent process 61 at step 183 and then exits the send next data subroutine 154A at step 189. The send next data item subroutine called from FIG. 7A, step 154.

Figure 8B:
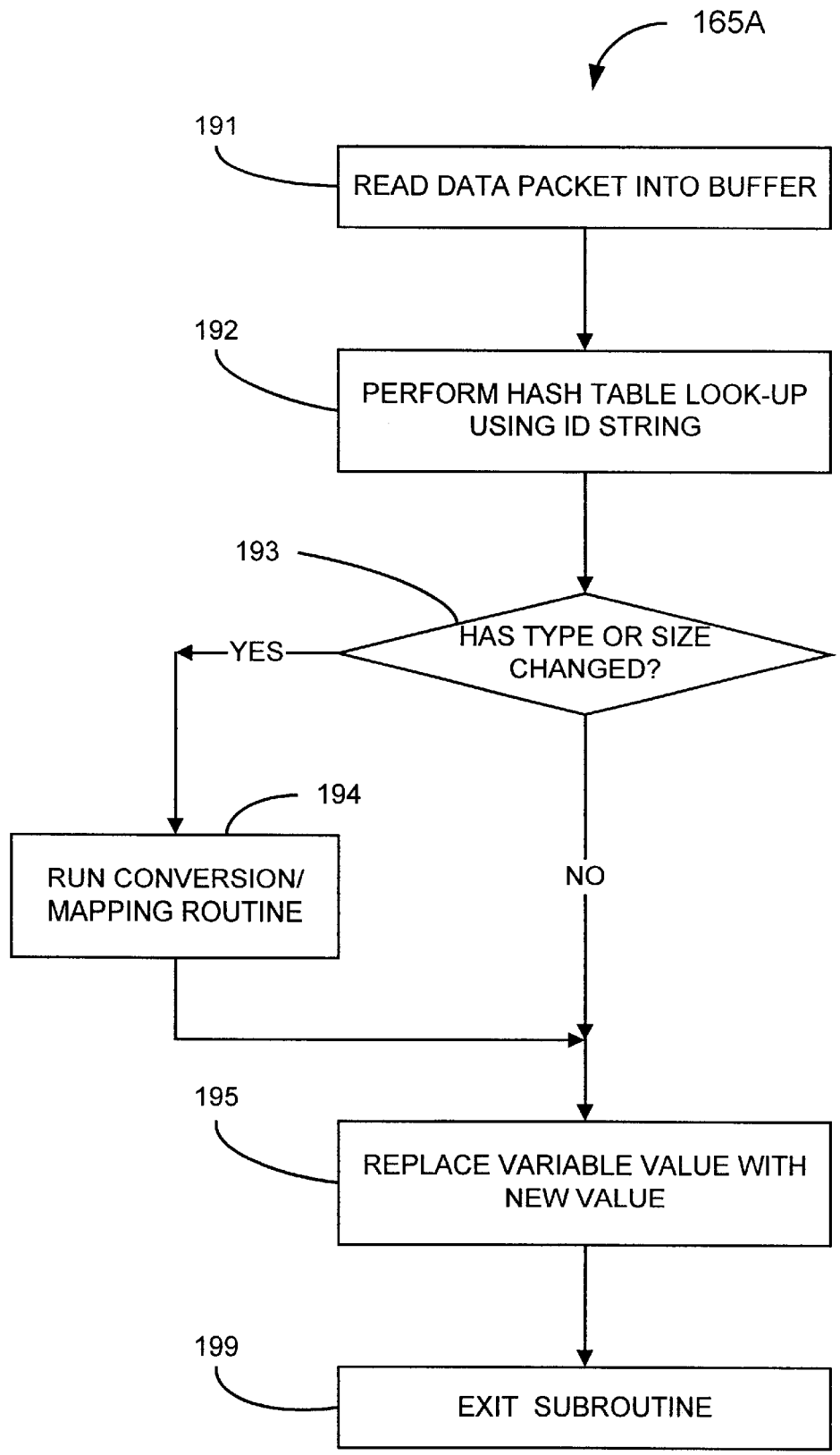
FIG. 8B is a flowchart of the parent process retrieve data subroutine, as shown in FIG. 7B.

Illustrated in FIG. 8B is the flowchart of the parent process 61 retrieve data subroutine 165A. First, in step 191, the parent process 61 reads a data packet 201 (FIG. 9A) into a memory. The parent process 61 performs a hash table lookup using the ID string at step 192. Thereafter, the parent process 61 next checks to see if the data item has a data type or size change at step 193. If the data item has changed its data type or its size, the parent process 61 executes a conversion or mapping routine 254 (FIG. 11) at step 194. After the conversion or mapping routine 254 is executed at step 194 or if the data item or size has not changed in step 194, then the parent process 61 replaces the variable value with a new value at step 195. The parent process retrieve data subroutine 165A is then exited at step 191 and returns to step 165 (FIG. 7B).

Illustrated in FIG. 9A is the block diagram of the variable data packet 201 (FIG. 9A) used by the child process 65 (FIG. 3) to send the parent process 61 (FIG. 3) the data items to be transferred from the child process 65 to the new parent process 61. The first data segment within the variable data packet 201 is the packet type field 202, used to indicate the type of packet and format (e.g., control data). The next data field is packet size field 203, which indicates the length of the variable data packet 201. This data packet size field 203 allows the parent process 61 to identify the actual length of the variable data packet 201.

The next item in the variable data packet 201 is the identifier field 204. The identifier field 204 indicates the data item reference or identification name. The data type field 205 indicates the type of data for the variable. As known in the art, there are numerous different data types, including, but not limited to, integer, real number, text character, floating point numbers, arrays, linked lists, and the like. The size field 206 indicates the size of the variable. The value of the variable is identified in the value field 207.

Illustrated in FIG. 9B is the block diagram for the hash table static data translation process 210. The hash table 211 contains numerous addresses of verification data structures 213. The parent process 61 (FIG. 3) uses the variable packet 201 identifier 204 to find the corresponding data variable utilizing the hash table 211. The hash table determines the address of 213 based on the hash of ID 204. The parent process 61 next verifies that the data type 205, data size 206, and data type from 213 match and the size from 213 match before using the value address in 213 to update the actual variable residing in the parent process 61 data segment 212.

One alternative embodiment method for automating the transfer uses variable description information from a compiler (not shown) usually made available to a debugger. Using this information, the state transfer mechanism can transfer all variables allocated in the global data portion of the process. The transfer of heap allocated data values needs to be handled as part of the processing of the global values that reference the heap. The transfer mechanism needs to traverse all data structures allocated in the heap and transfer them as a hierarchy of components. This transfer might require programmer supplied descriptions of the data structures involved or explicit management of the data transfer depending on the data types used.

Using the system described in the commonly-assigned and co-pending U.S. patent application entitled "MEMORY MANAGEMENT TECHNIQUES FOR ON-LINE REPLACEABLE SOFTWARE", Ser. No. 09/120,261 filed on Jul. 21, 1998, herein incorporated by reference, to show how the heap allocated data can be transferred when all data to be preserved in the transfer is allocated using the system described therein.

In summary, an allocation of enduring memory, that is memory to be preserved, includes an application specific ID that the application can use for future reference to indicate the allocated data's type. The system described therein also includes routines for iterating through all of the memory allocated using the system.

Figure 10A:
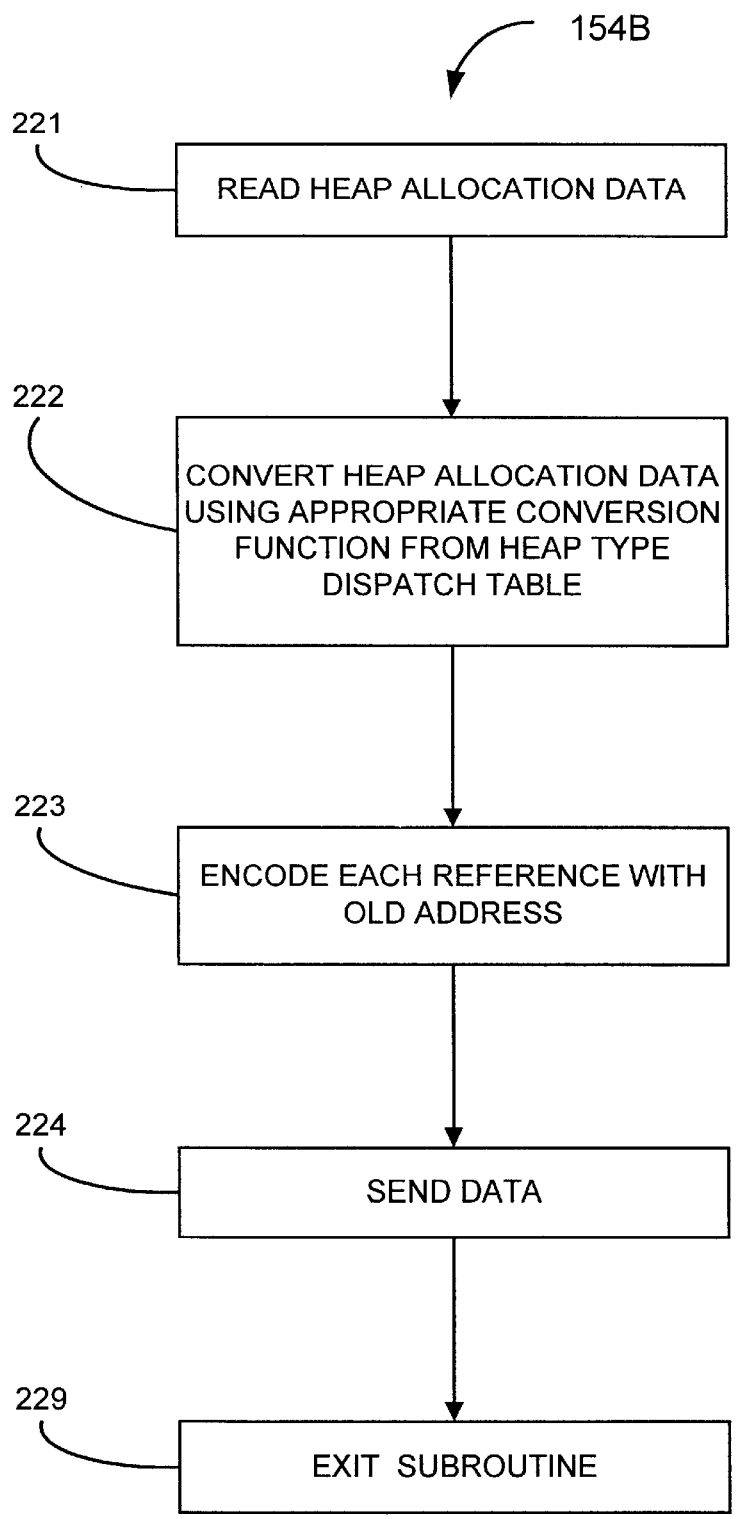
FIG. 10A is a flowchart of an alternative embodiment for the sending the next data item routine of the present invention as referenced in FIG. 7A.

Illustrated in FIG. 10A is a flowchart of an alternate heap data send subroutine 154B for sending heap data as performed within step 154 in FIG. 7A. First, the child process 65 (FIG. 3) reads the heap allocation data at step 221. If there is more heap allocation data to be processed, the child process then transfers the heap allocation data using the appropriate packet conversion function 274 at step 222. Thereafter, the child process 65 encodes each reference with the old address at step 223. The child process 65 then packages and sends the data to the parent process 61 (FIG. 3) at step 224. The process then transfers to step 229 which exits the subroutine and returns to step 154 in FIG. 7A.

Figure 10B:
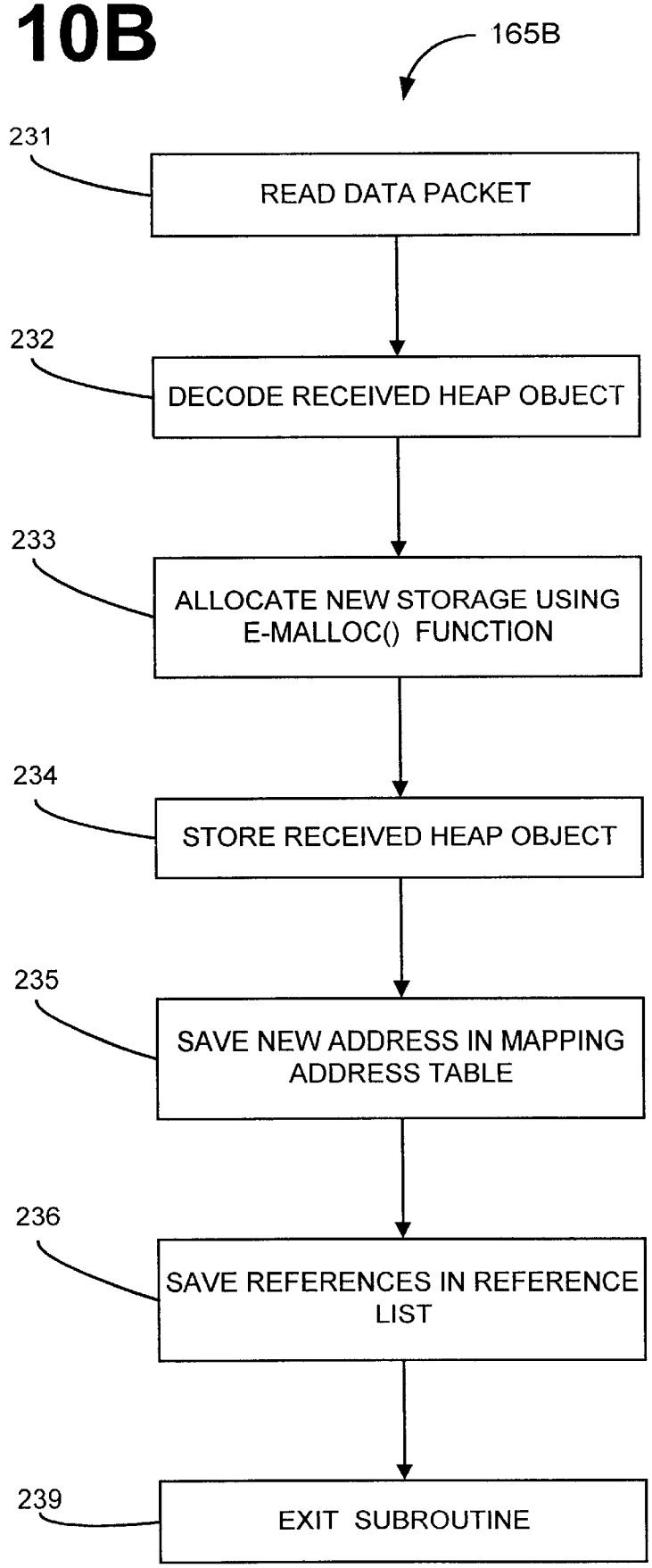
FIG. 10B is a flowchart of an alternative embodiment for receiving the data item as referenced in FIG. 7B.
Figure 11:
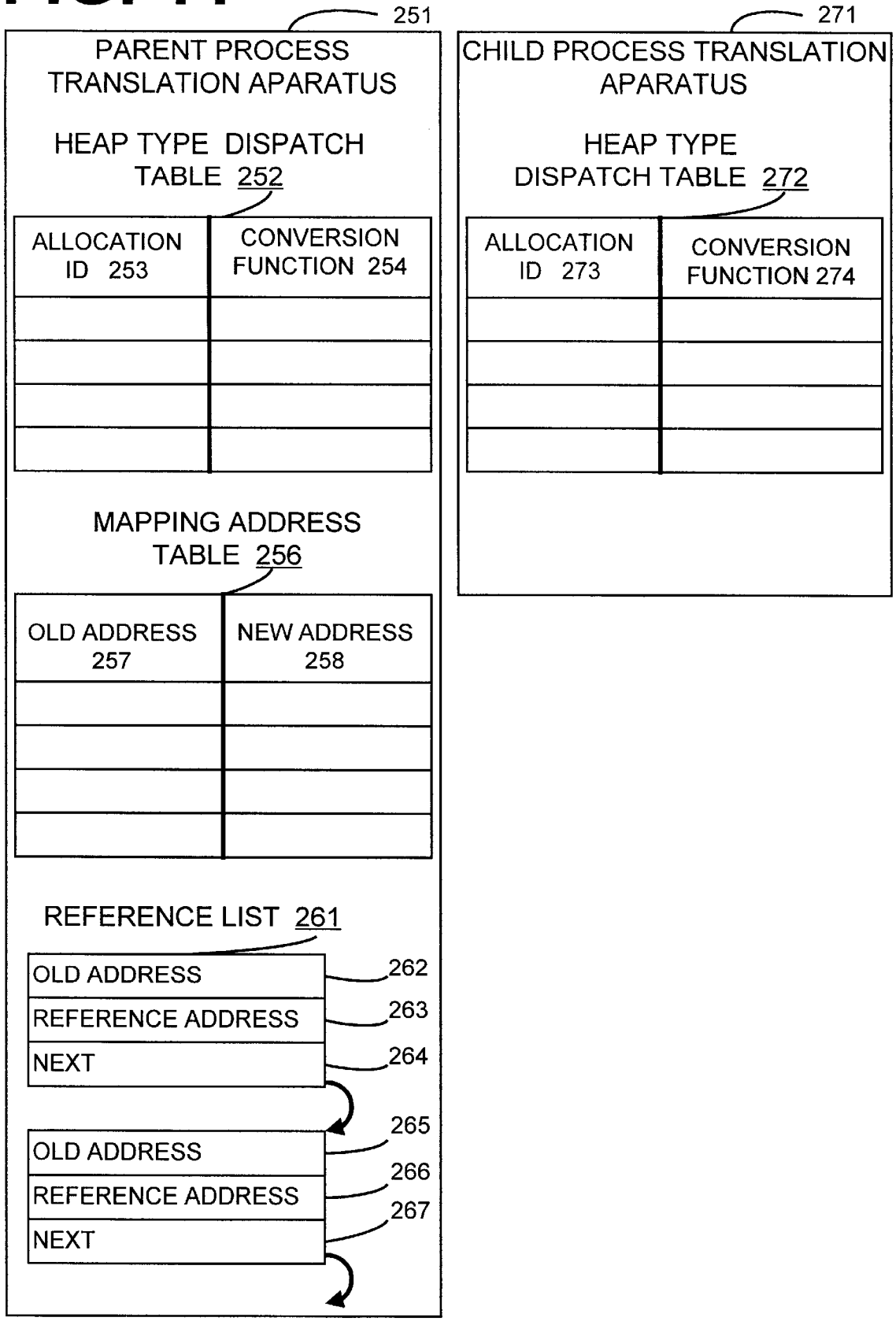
FIG. 11 is a block diagram of an alternative embodiment for the heap allocation variable data translation process.

Illustrated in FIG. 10B is a flowchart of an alternate heap data receive subroutine 165B for receiving heap data as referenced in FIG. 7B, at step 165. First, the parent process 61 (FIG. 3) reads the data packet 201 (FIG. 9A) at step 231. The parent process 61 then decodes the received heap object at step 232, using the conversion function 254 (FIG. 11). Next, the parent process 61 allocates new storage utilizing the e-malloc function (tags and tracks malloc'd data) at step 233. The parent process 61 then stores the received heap object at step 234.

The parent process 61 saves the new address created in the e-malloc function at step 235 in a mapping address table 256, herein described in further detail with reference to FIG. 11. The parent process 61 saves the old references and reference addresses in a reference list 261 herein defined in further detail with regard to FIG. 11, at step 236. It then exits the subroutine at step 239.

Illustrated in FIG. 11 is the block diagram for the heap allocation data translation process of the parent process 61 (FIG. 3) and child process 65 (FIG. 3) utilizing parent process translation apparatus 251 and child process translation apparatus 271. For every data type that is to be allocated, the application program 62 (FIG. 3) creates a heap type dispatch table 252 between the ID 253 used when allocating that type and the conversion routine 254 used to convert that data type to and from a data packet 201 (FIG. 9A). The transfer mechanism, utilizing the iteration method, will find all heap allocated objects as shown in FIG. 4, convert them to data packets 201 (FIG. 9A), and transfer them using the appropriate conversion routine 254 applying the reverse conversion in the parent process variable translation 251.

Since it is likely that data will not be placed at the same address in the new program 63, pointer linkages need to be updated in the parent process translation apparatus 251. This is handled by sending a tag, consisting of the old location, along with every pointed to object as shown in FIG. 9A. The old address 257 is placed in a table 256 in the new process 251 as part of the transfer. The data contents of the table are the new addresses 258 in the new process 251. All pointers references are transferred as a special type that is placed into a linked list 261 in the new process 251 with the original address 262 and a pointer to the new pointer 263. When the transfer is complete, the linked list 261 is processed an element at a time. The old address 262 is used as the key to the table 256 where the new address 258 is retrieved and placed into the new referencing pointer.

The on-line replacement of a running program comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical).

Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The foregoing description has been presented for purposes of illustration and description. It is not intended to be exhaustive or to limit the invention to the precise forms disclosed. Obvious modifications or variations are possible in light of the above teachings.

The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A computer apparatus for online program replacement comprising:

a means for executing a current program for providing a requested service;

a means for placing said current program in a predetermined state;

a means for determining if a newer program exists for providing said requested service;

a means for preserving current program data if said newer program exists; and wherein said executing means executes said newer program to provide said requested service and utilizes said preserving current program data during said newer program execution.

2. The apparatus of claim 1, wherein said preserving current program data means further comprises:

a means for saving current program data of said current program by forking a child process.

3. The apparatus of claim 2, wherein said executing means further comprises:

a means for retrieving said current program data from said saving current program data means; and a means for converting said current program data for use by said newer program.

4. The apparatus of claim 1, wherein said determining means further comprises:

a means for referencing a list of a plurality of service providing programs.

5. The apparatus of claim 1, wherein said placing said current program in a predetermined state means further comprises:

a checkpoint.

6. The apparatus of claim 1, wherein said repeatedly determining means periodically determines if a newer program exists for providing said requested service during execution of said current program.

7. A method for use in computer system for online program replacement, said method comprising said steps of:

executing a current program for providing a requested service;

placing said current program in a predetermined state;

determining if a newer program exists for providing said requested service;

maintaining current program data if said newer program exists;

executing said newer program to provide said requested service; and utilizing said current program data during said newer program execution.

8. The method of claim 7, wherein said maintaining step further comprising said step of:

forking a child process to save said current program data.

9. The method of claim 7, wherein said repeatedly determining step further comprising said step of:

referencing a list of a plurality of service providing programs.

10. The method of claim 7, wherein said placing step further comprising said step of:

utilizing a checkpoint in said current program.

11. The method of claim 7, wherein said utilizing said current program data step further comprising said step of:

converting said current program data for use by said newer program.

12. The method of claim 7, wherein said determining step periodically determines if said newer program exists for providing said requested service during execution of said current program.

13. An online program replacement apparatus, comprising:

a logic configured to provide a requested service;

a logic configured to place said service providing logic in a predetermined state;

a logic configured to repeatedly determine if a newer service providing logic exists for providing said requested service;

a logic configured to preserve service providing logic data if said newer service providing logic exists;

a logic configured to execute said newer service providing logic to provide said requested service if said newer service providing logic exists; and a logic configured to utilize said service providing logic data during said newer program execution.

14. The apparatus of claim 13, wherein said preserve service providing logic further comprises:

logic configured to fork a child process to save said service providing logic data.

15. The apparatus of claim 13, wherein said repeatedly determine logic further comprises:

logic configured to reference a list of a plurality of service providing logic to determine if said newer service providing logic exist.

16. The apparatus of claim 13, wherein said utilize logic further comprises:

logic configured to convert said service providing logic data for use by said newer service providing logic.

17. The apparatus of claim 13, wherein said place logic further comprises:

logic configured to provide a checkpoint.

18. The apparatus of claim 13, wherein said logic configured to repeatedly determine periodically determines if a newer program exists for providing said requested service during execution of said current program.

19. A computer readable medium having a program for replacing programs online, said program replacing product comprising:

a program means recorded for providing a requested service;

a means for placing said program means in a predetermined state;

a means for repeatedly determining if a newer program means exists for providing said requested service;

a means responsive to said newer program determining means, for preserving program means data if said newer program means exists; and a means responsive to said newer program determining means, for executing said newer program means to provide said requested service; and a means responsive to said newer program executing means, for utilizing said preserved program means data during said newer program means execution.

20. The medium of claim 19, wherein said means for preserving program data includes:

a first routine means, responsive to said means for repeatedly determining, for forking a child process to save said program means data.

21. The medium of claim 19, wherein said means for determining includes:

a second routine means, responsive to said means for placing, for referencing a list of a plurality of service providing program means.

22. The medium of claim 19, further comprising:

a third routine means, responsive to said means for executing, for converting said program means data for use by said newer program means.

23. The medium of claim 19, further comprising:

a fourth routine means, responsive to said means for placing said program means in a predetermined state, for utilizing a checkpoint to place said program means in said predetermined state.

24. The medium of claim 19, wherein said repeatedly determining means periodically determines if a newer program exists for providing said requested service during execution of said current program.

* * * * *